United States Patent
Kim

(10) Patent No.: US 11,643,988 B1
(45) Date of Patent: May 9, 2023

(54) ENGINE SYSTEM

(71) Applicants: Hyundai Motor Company, Seoul (KR); Kia Corporation, Seoul (KR)

(72) Inventor: Jonghyuck Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/900,588

(22) Filed: Aug. 31, 2022

(30) Foreign Application Priority Data

Oct. 29, 2021 (KR) .................. 10-2021-0146494

(51) Int. Cl.
*F02D 41/00* (2006.01)
*F02M 26/25* (2016.01)
*F02M 26/35* (2016.01)

(52) U.S. Cl.
CPC ......... *F02D 41/0077* (2013.01); *F02M 26/25* (2016.02); *F02M 26/35* (2016.02); *F02D 2200/501* (2013.01); *F02D 2200/70* (2013.01)

(58) Field of Classification Search
CPC ............. F02D 41/007; F02D 2200/201; F02D 2200/70; F02M 26/25; F02M 26/35
See application file for complete search history.

(56) References Cited

U.S. PATENT DOCUMENTS

| | | | | |
|---|---|---|---|---|
| 4,075,992 A * | 2/1978 | Linder | .................. | F02B 77/086 123/568.26 |
| 4,130,098 A * | 12/1978 | Linder | .................. | F02M 26/46 123/698 |
| 6,164,063 A * | 12/2000 | Mendler | ................ | F01N 3/2882 60/297 |
| 11,085,364 B2 * | 8/2021 | Kang | ................... | F02B 29/0468 |
| 2004/0006978 A1 * | 1/2004 | Beck | ...................... | F02M 26/35 60/297 |
| 2005/0115222 A1 * | 6/2005 | Blomquist | .......... | F01N 13/0097 60/311 |
| 2008/0022980 A1 * | 1/2008 | Melchior | ............ | F02D 13/0276 123/585 |
| 2008/0223038 A1 * | 9/2008 | Lutz | ....................... | F02M 26/51 60/320 |
| 2017/0022886 A1 * | 1/2017 | Dieterle | ............. | F02M 25/0225 |
| 2017/0298874 A1 * | 10/2017 | Kuske | .................... | F02M 26/24 |
| 2018/0119651 A1 * | 5/2018 | Minami | ................. | F02M 26/24 |
| 2021/0148660 A1 * | 5/2021 | Kang | .................... | F28D 7/1684 |
| 2021/0180533 A1 * | 6/2021 | Rahm | .................... | F02M 26/36 |

\* cited by examiner

*Primary Examiner* — Sizo B Vilakazi
*Assistant Examiner* — Sherman D Manley
(74) *Attorney, Agent, or Firm* — Morgan, Lewis & Bockius LLP

(57) ABSTRACT

An engine system, includes a bypass line branched from an intake line upstream of an intercooler and joining the intake line downstream of the intercooler; a condensed water separation line branched from the intake line upstream of the intercooler and joining the intake line upstream of the intercooler; a condensed water separation module provided in the condensed water separation line and configured to separate condensed water contained in a mixture flowing through the condensed water separation line; and a four-way valve provided in the intake line between a compressor and the intercooler, and selectively operated so that the mixture of the outside air and the recirculation gas introduced to the upstream of the intercooler passes through the intercooler, flows through the bypass line, or flows through the condensed water separation line.

17 Claims, 16 Drawing Sheets

ENGINE SYSTEM

CROSS-REFERENCE TO RELATED APPLICATION

The present application claims priority to Korean Patent Application No. 10-2021-0146494 filed on Oct. 29, 2021, the entire contents of which is incorporated herein for all purposes by this reference.

BACKGROUND OF THE PRESENT DISCLOSURE

Field of the Present Disclosure

The present disclosure relates to an engine system, and more particularly, to an engine system capable of preventing condensed water generated by mixing low-temperature outside air and high-temperature recirculation gas from introduced into an engine cylinder.

Description of Related Art

An engine of a vehicle mixes air introduced from the outside thereof with fuel in an appropriate ratio and burns the mixture to generate power.

In a process of generating power by driving the engine, the desired output and combustion efficiency may be obtained only when sufficient outside air is supplied for combustion. To the present end, a turbocharger is used as a device for supercharging combustion air to increase the combustion efficiency of the engine.

In general, a turbocharger is a device for increasing the output of an engine by rotating a turbine by use of the pressure of exhaust gas discharged from an engine, and then supplying high-pressure air to a combustion chamber by use of rotation force of the turbine. The turbocharger is applied to most diesel engines, and recently the turbocharger is also applied to gasoline engines.

Furthermore, nitrogen oxide (NOx) contained in exhaust gas is regulated as a major air pollutant, and many studies are being conducted to reduce the emission of such NOx.

An exhaust gas recirculation (EGR) system is a system mounted on a vehicle to reduce harmful exhaust gases. In general, NOx increases when the combustion is good because the proportion of air in the mixture is high. Therefore, the EGR system is a system that reduces the amount of oxygen in the mixture and interrupts the combustion by mixing a part (for example, 5 to 20%) of the exhaust gas discharged from the engine to the mixture again to suppress the generation of NOx.

A typical EGR system is a low pressure EGR device. The low-pressure EGR device recirculates the exhaust gas that has passed through the turbine of the turbocharger to an intake passage at an front end portion of a compressor. At the instant time, the recirculated exhaust gas is cooled through a low-pressure EGR cooler.

However, the exhaust gas recirculated by the EGR system is generally very high in temperature and humidity. When the recirculated exhaust gas is cooled by a cooler, condensed water is generated, and at the instant time, the generated condensed water is collected in the EGR cooler or the recirculation passage (for example, the EGR passage). Because the condensed water has a very high acidity due to various harmful components contained in the exhaust gas, there is a problem in that the EGR cooler or the recirculation passage is corroded.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an engine system for preventing condensed water generated by low-temperature outside air and high-temperature exhaust gas from introduced into a combustion chamber of the engine.

Various aspects of the present disclosure are directed to providing an engine system, including: an engine including a combustion chamber generating driving force by combustion of fuel therein; an intake line through which outside air supplied to the combustion chamber flows; an exhaust line through which exhaust gas discharged from the combustion chamber flows; a turbocharger including a turbine rotating by the exhaust gas discharged from the combustion chamber and a compressor rotating in conjunction with the turbine and compressing the outside air; an exhaust gas recirculation device including an exhaust gas recirculation (EGR) line branched from the exhaust line and joining the intake line, an EGR cooler provided in the EGR line, and an EGR valve provided in the EGR line; an intercooler provided in the intake line downstream of the compressor and configured to cool the outside air compressed by the compressor and a recirculation gas recirculated by the exhaust gas recirculation device; a bypass line branched from the intake line upstream of the intercooler and joining the intake line downstream of the intercooler; a condensed water separation line branched from the intake line upstream of the intercooler and joining the intake line upstream of the intercooler; a condensed water separation module provided in the condensed water separation line and configured to separate condensed water contained in a mixture flowing through the condensed water separation line; and a four-way valve provided in the intake line between the compressor and the intercooler, and selectively operated so that the mixture of the outside air and the recirculation gas introduced to the upstream of the intercooler passes through the intercooler, flows through the bypass line, or flows through the condensed water separation line.

The engine system may further include a controller electrically connected to the four-way valve and configured for controlling an operation of the four-way valve based on a recirculation gas use situation determined based on at least one of an outside air temperature, humidity of the recirculation gas, and a vehicle speed.

when the outside air temperature is lower than a reference temperature and the humidity of the recirculation gas is less than a reference humidity, the controller may be configured to determine that a situation of the engine system is a recirculation gas non-use situation, and operate the four-way valve so that the mixture compressed by the compressor passes through the intercooler.

When the outside air temperature is equal to or greater than a reference temperature and the humidity of the recirculation gas is equal to or greater than a reference humidity, the controller may be configured to determine that a situation of the engine system is a recirculation gas use situation, and when the vehicle speed is less than a first reference speed, the controller may operate the four-way valve so that the mixture compressed by the compressor passes through the bypass line.

When the outside air temperature is equal to or greater than the reference temperature and the humidity of the recirculation gas is equal to or greater than the reference humidity, the controller may be configured to conclude that the situation is the recirculation gas use situation, and when the vehicle speed is equal to or greater than a second reference speed which is greater than the first reference speed, the controller may operate the four-way valve so that the mixture compressed by the compressor passes through the intercooler.

When the vehicle speed is between the first reference speed and the second reference speed and the humidity of the recirculation gas is less than the first reference humidity, the controller may operate the four-way valve so that the mixture compressed by the compressor passes through the intercooler, flows through the bypass line, or passes through the intercooler and flows through the bypass line.

The controller may operate the four-way valve to increase a flow rate of the mixture passing through the intercooler more than a flow rate of the mixture flowing through the bypass line when the outside air temperature increases.

When the vehicle speed is between the first reference speed and the second reference speed and the humidity of the recirculation gas is between a first reference humidity and a second reference humidity higher than the first reference humidity, the controller may operate the four-way valve so that the mixture compressed by the compressor passes through the intercooler, flows through the condensed water separation line, or passes through the intercooler and flows through the condensed water separation line.

The controller may operate the four-way valve to increase a flow rate of the mixture passing through the intercooler more than a flow rate of the mixture flowing through the condensed water separation line when the outside air temperature increases.

When the vehicle speed is between the first reference speed and the second reference speed and the humidity of the recirculation gas is between a second reference humidity higher than a first reference humidity and a third reference humidity higher than the second reference humidity, the controller may operate the four-way valve so that the mixture compressed by the compressor flows through the bypass line, flows through the bypass line and the condensed water separation line, flows through the condensed water separation line, passes through the condensed water separation line and the intercooler, or passes through the intercooler.

The controller may operate the four-way valve so that as the outside air temperature increases, a flow rate of the mixture flowing through the condensed water separation line increases more than a flow rate of the mixture flowing through the bypass line, and a flow rate of the mixture passing through the intercooler increases more than the flow rate of the mixture flowing through the condensed water separation line.

When the vehicle speed is between the first reference speed and the second reference speed and the humidity of the recirculation gas is equal to or greater than a third reference humidity, the controller may operate the four-way valve so that the mixture compressed by the compressor passes through the intercooler.

When the vehicle speed is between the first reference speed and the second reference speed and the humidity of the recirculation gas is equal to or greater than a fourth reference humidity higher than the third reference humidity, the controller may operate the four-way valve so that the mixture compressed by the compressor passes through the intercooler.

The condensed water separation module may include: a module external main body; a module internal main body provided inside the module external main body; a rotation guide provided inside the module internal main body; a storage chamber formed between the module external main body and the module internal main body; and a communication hole formed in the module internal main body and fluidically-communicating with the storage chamber.

According to the engine system according to the exemplary embodiment of the present disclosure as described above, it is possible to prevent engine damage due to the condensed water in advance by minimizing the condensed water introduced into the combustion chamber of the engine.

Furthermore, it is possible to minimize the generation of condensed water by supplying the mixture to the combustion chamber of the engine through three flow paths.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
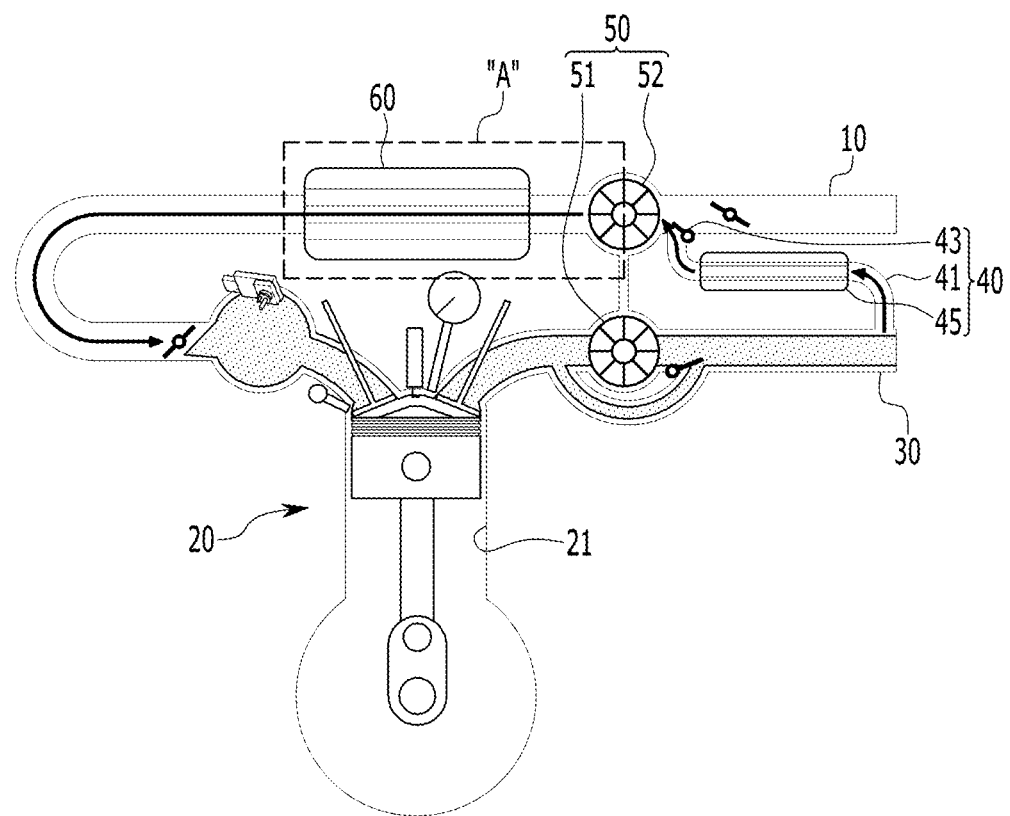
FIG. 1 is a conceptual diagram illustrating a configuration of an engine system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments to various embodiments of the present disclosure(s), examples of which are illustrated in the accompanying drawings and described below. While the present disclosure (s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, the size and thickness of each configuration shown in the drawings are arbitrarily shown for understanding and ease of description, but the present disclosure is not limited thereto, and the thickness of layers, films, panels, regions, etc., are exaggerated for clarity.

Hereinafter, an engine system according to various exemplary embodiments of the present disclosure as described above will be described in detail with reference to the accompanying drawings.

Figure 2:
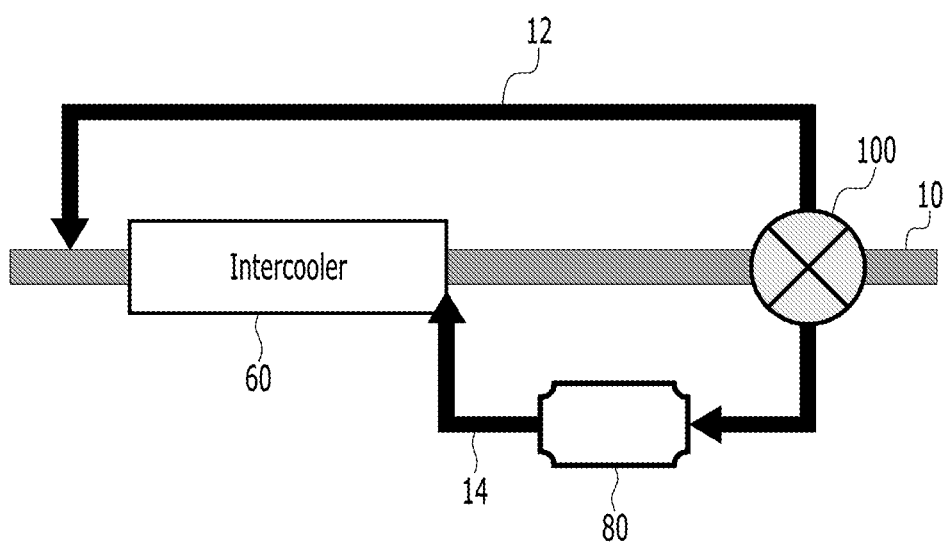
FIG. 2 is an enlarged diagram of a display part "A" of FIG. 1 according to various exemplary embodiments of the present disclosure.

FIG. 1 is a conceptual diagram illustrating a configuration of an engine system according to various exemplary embodiments of the present disclosure. FIG. 2 is an enlarged diagram of a display part "A" of FIG. 1 according to various exemplary embodiments of the present disclosure. Furthermore, FIG. 3 is a block diagram illustrating the configuration of the engine system according to the exemplary embodiment of the present disclosure.

Figure 3:
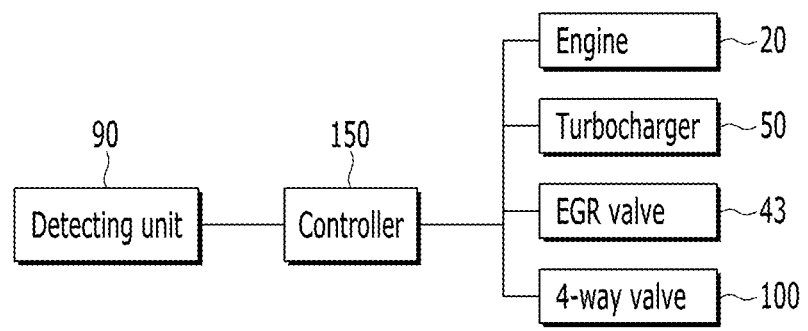
FIG. 3 is a block diagram illustrating the configuration of the engine system according to the exemplary embodiment of the present disclosure.

As illustrated in FIG. 1, FIG. 2, and FIG. 3, an engine system according to various exemplary embodiments of the present disclosure may include an engine 20 including a plurality of combustion chambers 21 for generating driving force necessary for traveling of a vehicle by combustion of fuel, an intake line 10 through which fresh air (or outside air) supplied to the combustion chamber flows, an exhaust line 30 through which the exhaust gas discharged from the combustion chamber flows, a turbocharger 50 for compressing the fresh air supplied to the combustion chamber and the recirculated exhaust gas (hereinafter referred to as "recirculation gas"), and an exhaust gas recirculation (EGR) apparatus 40 for recirculating exhaust gas discharged from the combustion chamber to the combustion chamber.

The exhaust line 30 is provided with a catalytic converter for purifying various substances contained in the exhaust gas discharged from the combustion chamber. The catalytic converter may include a lean NOx trap (LNT), a diesel oxidation catalyst, and a diesel particulate filter for purifying nitrogen oxides.

The turbocharger 50 may include a turbine 51 which is provided in the exhaust line 30 and rotates by the exhaust gas discharged from the combustion chamber, and a compressor 52 which is provided in the intake line 10, and rotates in conjunction with the turbine 51 to compress fresh air and the recirculated gas.

The EGR apparatus 40 may include an EGR line 41 branched from the exhaust line 30 and joining the intake line 10, an exhaust gas recirculation (EGR) cooler 45 provided in the EGR line 41, and an EGR valve 43 provided in the EGR line 41. The EGR cooler 45 cools the high-temperature exhaust gas recirculated through the EGR line 41. The amount of recirculation gas recirculated through the EGR line 41 is controlled by the opening amount of the EGR valve 43.

An intercooler 60 is provided in the intake line 10 downstream of the compressor 52, and the high-temperature/high-pressure mixture (outside air and recirculation gas) compressed by the compressor 52 of the turbocharger 50 is cooled by an intercooler 60.

The engine system according to the exemplary embodiment of the present disclosure includes a bypass line 12 which is branched from the intake line 10 upstream of the intercooler 60 and joining the intake line 10 downstream of the intercooler 60.

Furthermore, the engine system according to the exemplary embodiment of the present disclosure includes a condensed water separation line 14 which is branched from the intake line 10 upstream of the intercooler 60 and joining the intake line 10 upstream of the intercooler 60, and a condensed water separation module 80 is provided in the condensed water separation line 14.

Figure 4:
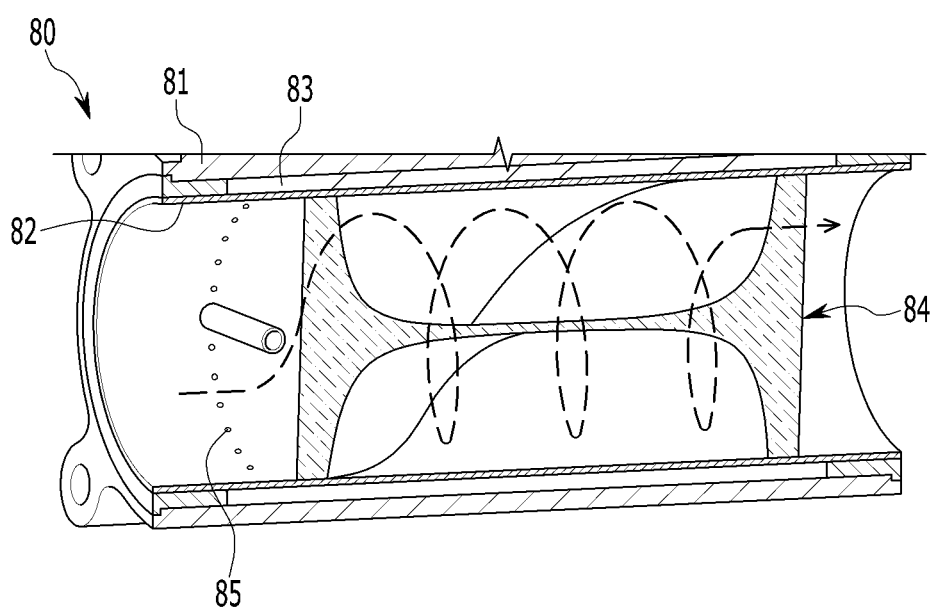
FIG. 4 is a partially cut-away perspective view exemplarily illustrating a configuration of a condensed water separating module according to the exemplary embodiment of the present disclosure.

Referring to FIG. 4, the condensed water may be separated from the mixture including the condensed water passing through the condensed water separation module 80 by centrifugal force.

In the exemplary embodiment of the present disclosure, the condensed water separation module 80 may include a module external main body 81, a module internal main body 82 provided inside the module external main body 81, and a rotation guide 84 provided inside the module internal main body 82.

The module external main body 81 and the module internal main body 82 are spaced from each other by a predetermined interval, and a storage chamber 83 for storing condensed water is formed between the module external main body 81 and the module internal main body 82. A communication hole 85 fluidically-communicating with the storage chamber 83 is formed on the internal surface of the module internal main body 82.

The mixture of outside air and recirculation gas introduced into the condensed water separation module 80 is rotated in the circumferential direction by the rotation guide 84. Due to the large size of the specific gravity of the condensed water contained in the mixture rotating in the circumferential direction, the condensed water moves to the internal surface of the module internal main body 82 and is introduced into the storage chamber 83 through the communication hole 85 while receiving large centrifugal force.

The condensed water introduced into the storage chamber 83 is naturally evaporated gradually as the temperature inside the engine room increases.

The four-way valve 100 is provided in the intake line 10 upstream of the intercooler 60 (for example, the intake line 10 at a point at which the intake line 10, the bypass line 12, and the condensed water separation line 14 joins), and the mixture introduced upstream of the intercooler 60 according to the operation of the four-way valve 100 passes through the intercooler 60, flows along the bypass line 12, or flows along the condensed water separation line 14.

Hereinafter, the configuration of the four-way valve 100 according to the exemplary embodiment of the present disclosure will be described in detail with reference to the accompanying drawings.

Figure 5:
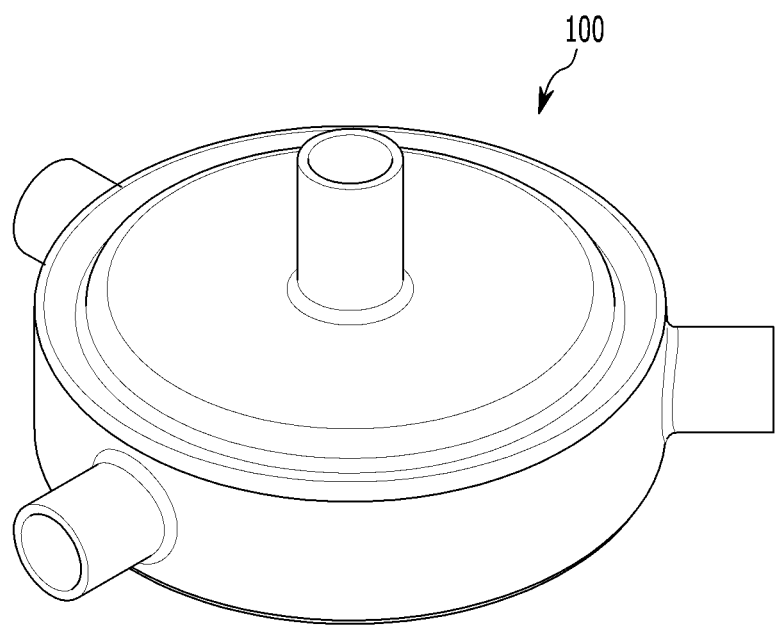
FIG. 5 is a perspective view exemplarily illustrating a configuration of a four-way valve according to the exemplary embodiment of the present disclosure.

FIG. 5 is a perspective view exemplarily illustrating a configuration of the four-way valve according to the exemplary embodiment of the present disclosure. Furthermore, FIG. 6 is a conceptual diagram illustrating the configuration of the four-way valve 100 according to the exemplary embodiment of the present disclosure.

Figure 6:
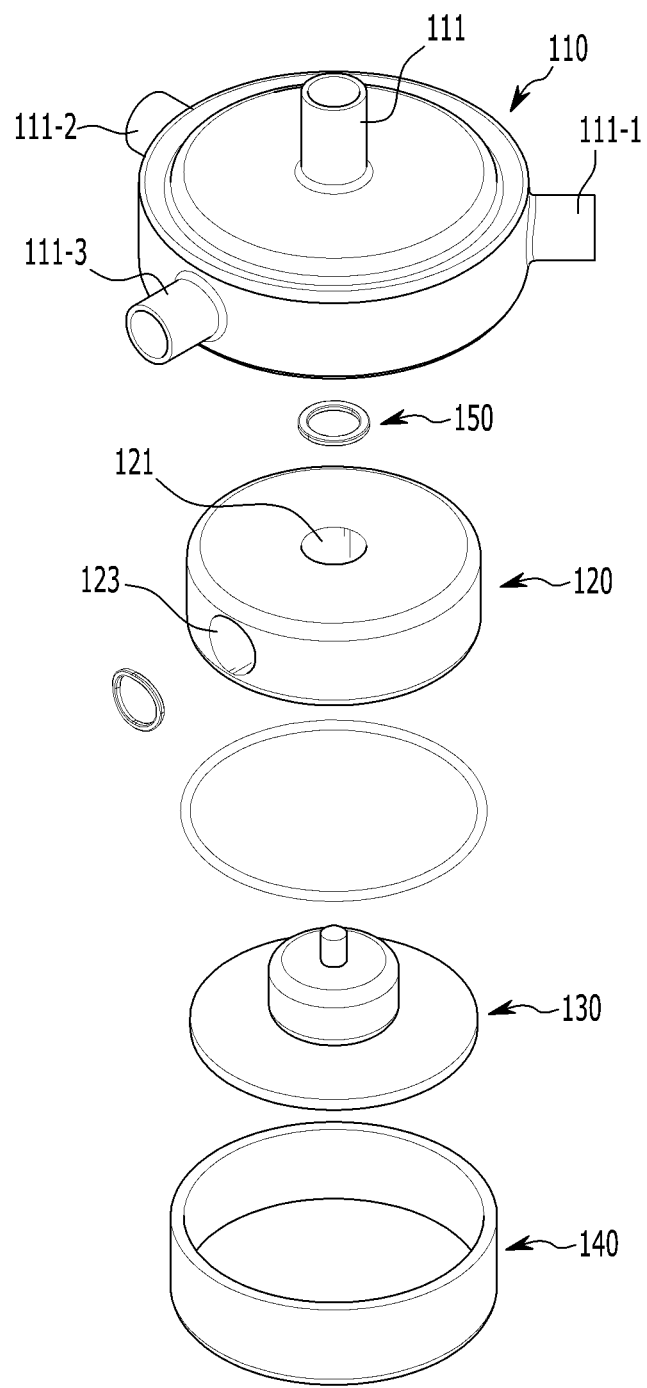
FIG. 6 is a exploded perspective view exemplarily illustrating a configuration of a four-way valve according to the exemplary embodiment of the present disclosure.
Figure 7:
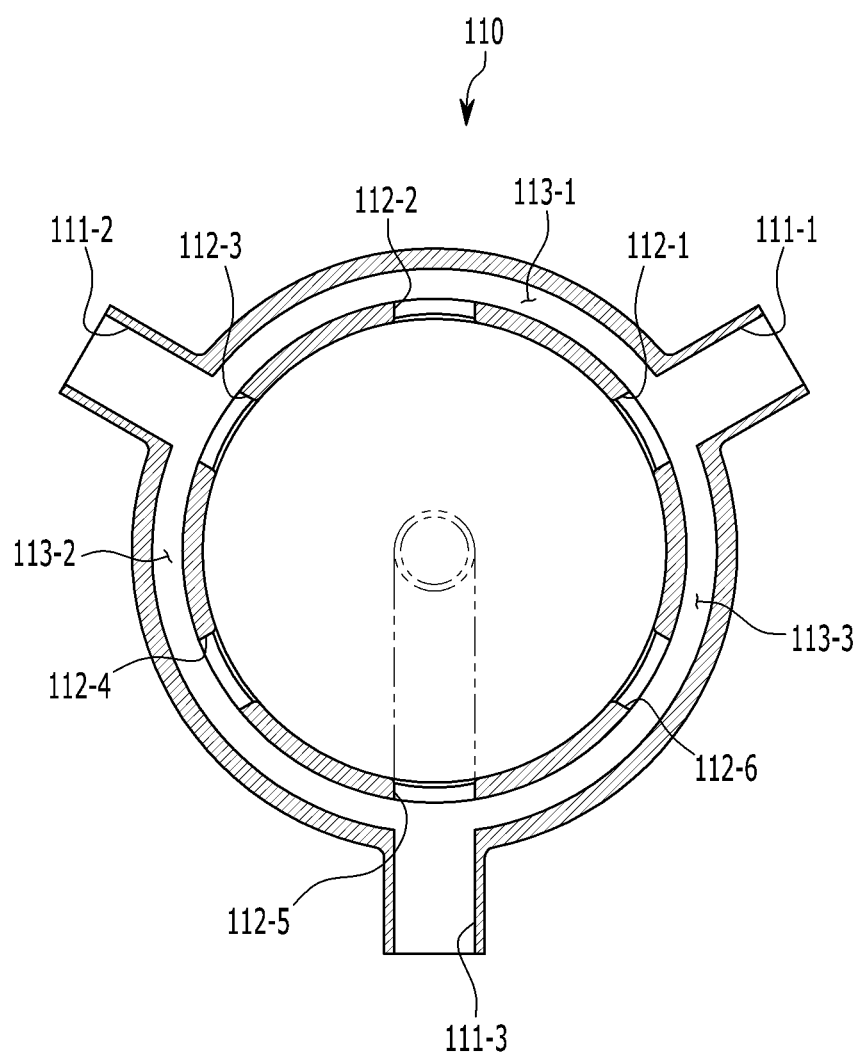
FIG. 7 is a cross-sectional view exemplarily illustrating a configuration of a four-way valve according to the exemplary embodiment of the present disclosure.
Figure 8:
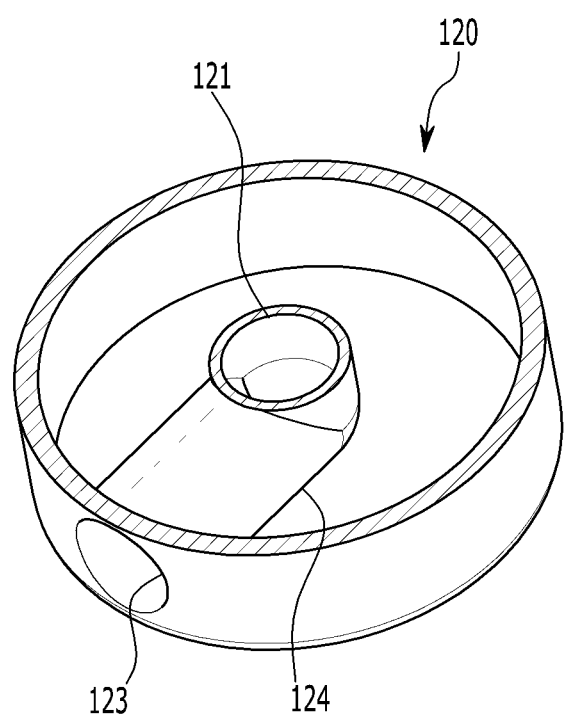
FIG. 8 is a diagram illustrating a configuration of an internal housing according to the exemplary embodiment of the present disclosure.

As illustrate in FIG. 5 and FIG. 6, the four-way valve 100 according to the exemplary embodiment of the present disclosure may include an external housing 110 and an internal housing 120 mounted inside the external housing 110.

The external housing 110 may be formed in a substantially cylindrical shape in which a central chamber is formed. The external housing 110 is rotatably provided on the internal housing 120.

The internal housing 120 may rotate at a predetermined interval (for example, 60 degrees) by the power of the driver 130 (for example, a motor or a solenoid).

An external inlet 111 is formed in the upper center portion of the external housing 110, and a first external outlet 111-1, a second external outlet 111-2, and a third external outlet 111-3 for the external inlet 111 are formed at a predetermined interval (for example, 120 degree intervals) on the side of the external housing 110.

The external inlet 111 of the external housing 110 is connected to the intake line 10 downstream of the compressor 52, wherein the first external outlet 111-1 is connected to the intake line 10 upstream of the intercooler 60, the second external outlet 111-2 is connected to the bypass line 12, and the third external outlet 111-3 is connected to the condensed water separation line 14.

Inside the external housing 110, a first intermediate outlet 112-1, a second intermediate outlet 112-2, a third intermediate outlet 112-3, a fourth intermediate outlet 112-4, a fifth intermediate outlet 112-5, and a sixth intermediate outlet 112-6 are sequentially formed at a set interval (for example, 60 degree interval) in the circumferential direction thereof.

Furthermore, inside the external housing 110, a first connection chamber 113-1 that fluidly connects the first external outlet 111-1 and the second external outlet 111-2, a second connection chamber 113-2 that fluidly connects the second external outlet 111-2 and the third external outlet 111-3, and a third connection chamber 113-3 that fluidly connects the third external outlet 111-3 and the first external outlet 111-1 are formed.

At the present time, the first intermediate outlet 112-1 is fluidly connected to the first external outlet 111-1, the third intermediate outlet 112-3 is fluidly connected to the second external outlet 111-2, and the fifth intermediate outlet 112-5 is fluidly connected to the third external outlet 111-3.

Furthermore, the second intermediate outlet 112-2 is fluidly connected to the first connection chamber 113-1, and the fourth intermediate outlet 112-4 is fluidly connected to the second connection chamber 113-2, and the sixth intermediate outlet 112-6 is fluidly connected to the third connection chamber 113-3.

The internal housing 120 is formed in a substantially cylindrical shape to correspond to the external housing 110 to be rotatably provided inside the external housing 110.

In the internal housing 120, an internal inlet 121 which is always in communication with the external inlet 111 of the external housing 110, and an internal outlet 123 selectively fluidically-communicating with the first intermediate outlet 112-1 to the sixth intermediate outlet 112-6 are formed. The internal inlet 121 and the internal outlet 123 are connected through an internal connecting pipe 124.

The internal outlet 123 is selectively fluidically-fluidically-communicating with the first intermediate outlet 112-1 to the sixth intermediate outlet 112-6 of the external housing 110. According to the rotation of the internal housing 120, the internal outlet 123 may fluidically-communicate with the first intermediate outlet 112-1, the second intermediate outlet 112-2, the third intermediate outlet 112-3, and the fourth intermediate outlet 112-4, the fifth intermediate outlet 112-5, and the sixth intermediate outlet 112-6.

Figure 9:
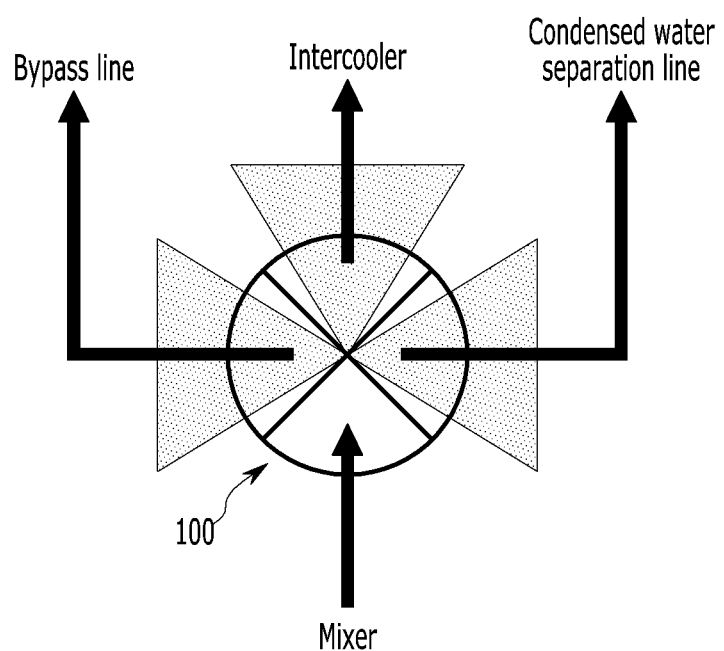
FIG. 9 is a conceptual diagram illustrating the four-way valve according to the exemplary embodiment of the present disclosure.

Accordingly, when the internal outlet 123 fluidically-communicates with the first intermediate outlet 112-1, the mixture introduced through the external inlet 111 is discharged to the first external outlet 111-1 through the first intermediate outlet 112-1 and passes through the intercooler 60 (see FIG. 9) (in other words, passes through the intercooler flow path).

When the internal outlet 123 fluidically-communicates with the second intermediate outlet 112-2, the mixture introduced through the external inlet 111 is discharged to the first external outlet 111-1 and the second external outlet 111-2 through the first connection chamber 113-1, and some mixtures pass through the intercooler 60 and the remaining mixture flows through the bypass line 12.

Figure 10:
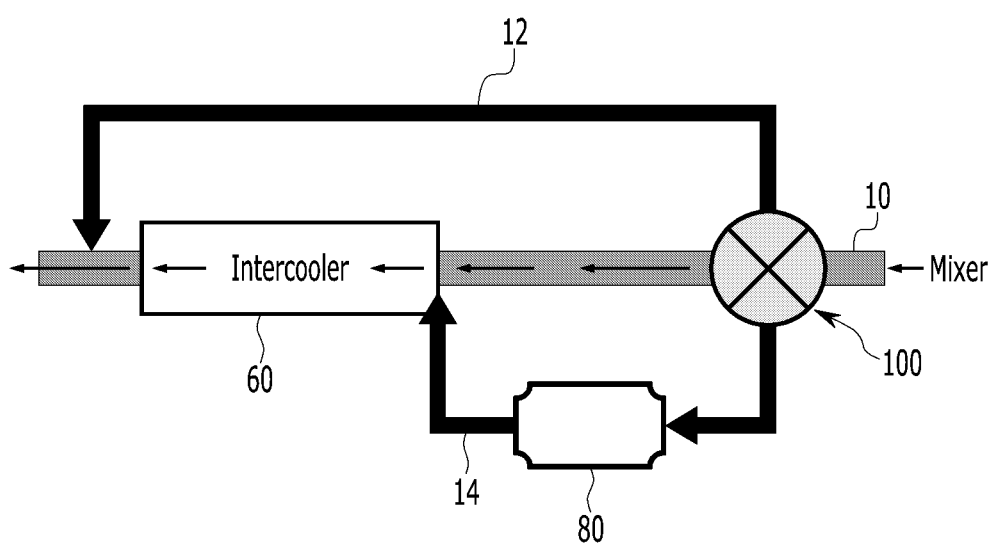
FIG. 10, FIG. 11, and FIG. 12 are conceptual diagrams illustrating a flow path of a mixture according to the exemplary embodiment of the present disclosure.

When the internal outlet 123 fluidically-communicates with the third intermediate outlet 112-3, the mixture introduced through the external inlet 111 is discharged to the second external outlet 111-2 through the third intermediate outlet 112-3 and flows through the bypass line 12 (see FIG. 10) (in other words, passes through the bypass flow path).

When the internal outlet 123 fluidically-communicates with the fourth intermediate outlet 112-4, the mixture introduced through the external inlet 111 is discharged to the second external outlet 111-2 and the third external outlet 111-3 through the second connection chamber 113-2, so that some mixtures flows through the bypass line 12 and the remaining mixture flows through the condensed water separation line 14.

Figure 11:
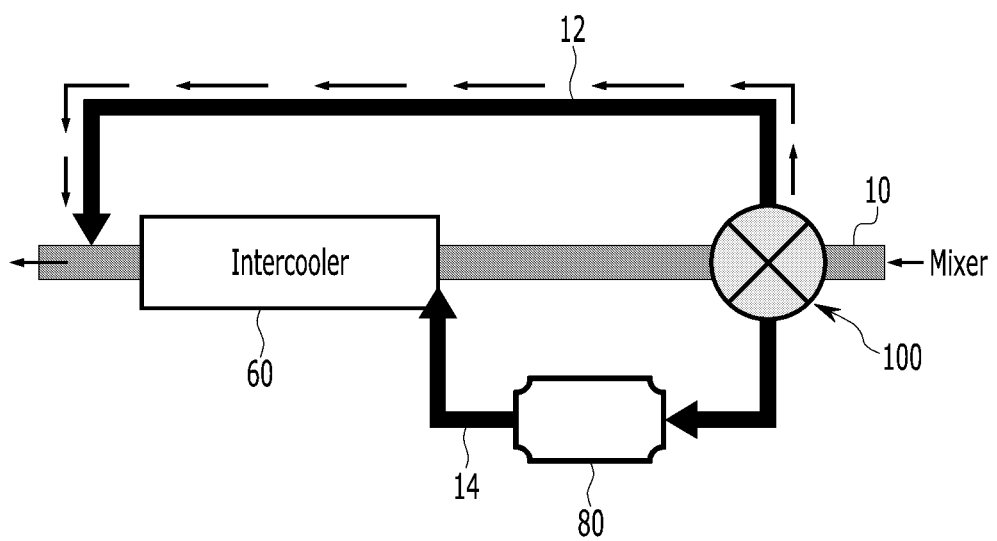
Figure 12:
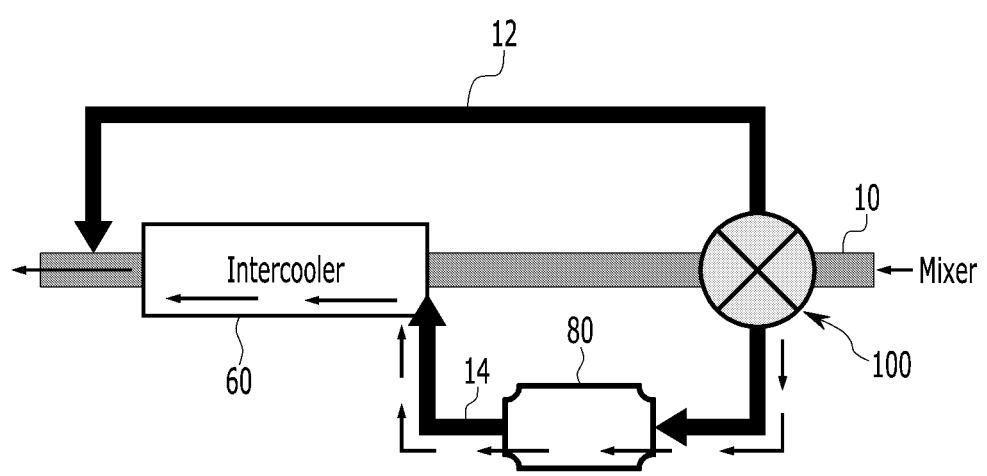
Figure 13:
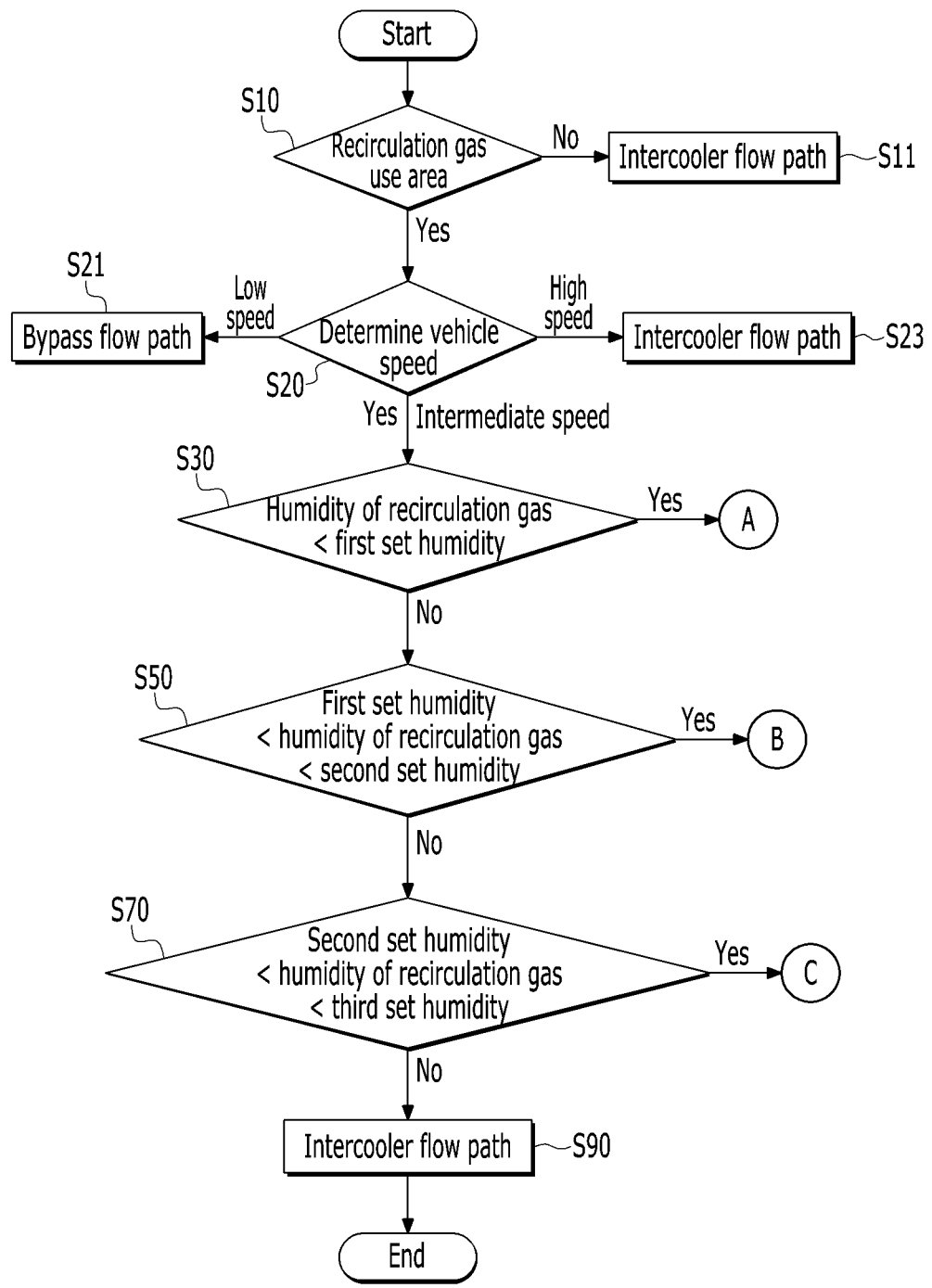
FIG. 13, FIG. 14, FIG. 15 and FIG. 16 are flowcharts illustrating an operation of the engine system according to the exemplary embodiment of the present disclosure.
Figure 14:
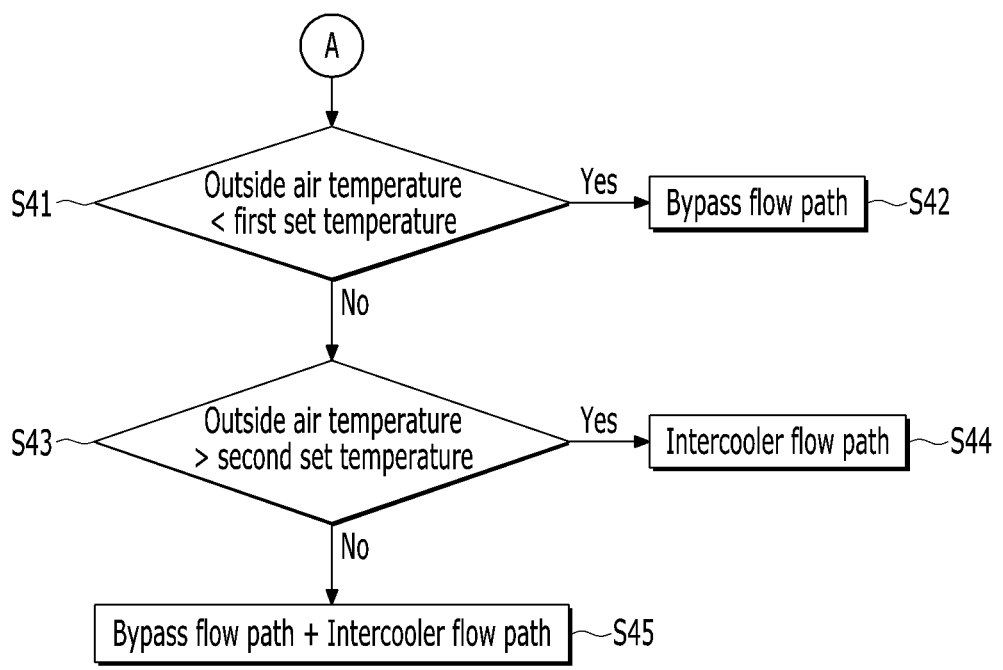
Figure 15:
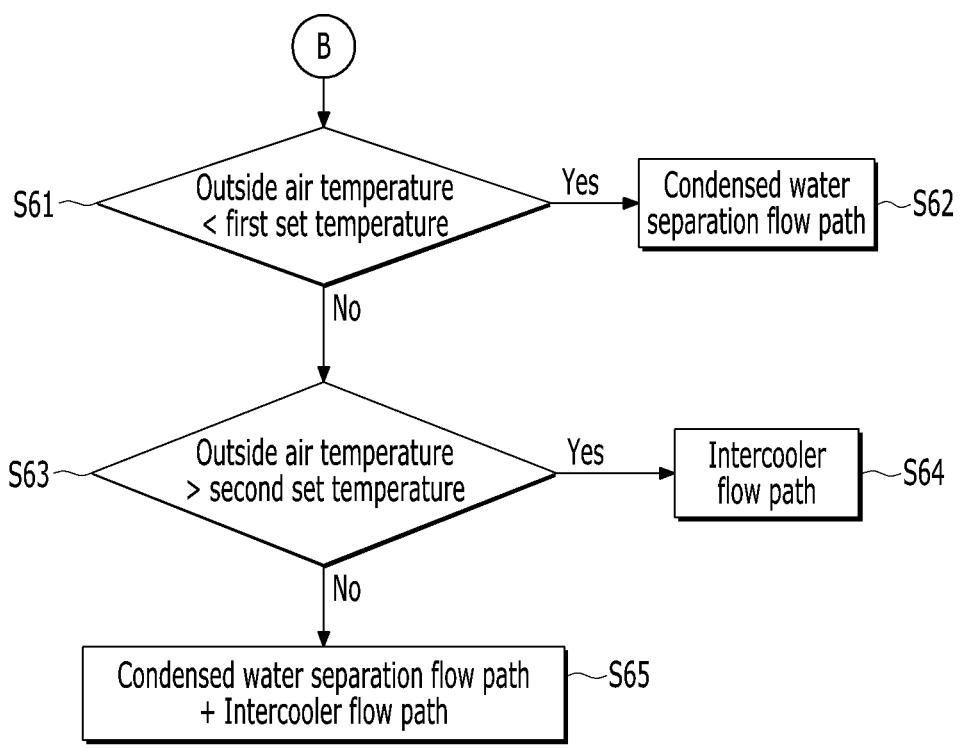
Figure 16:
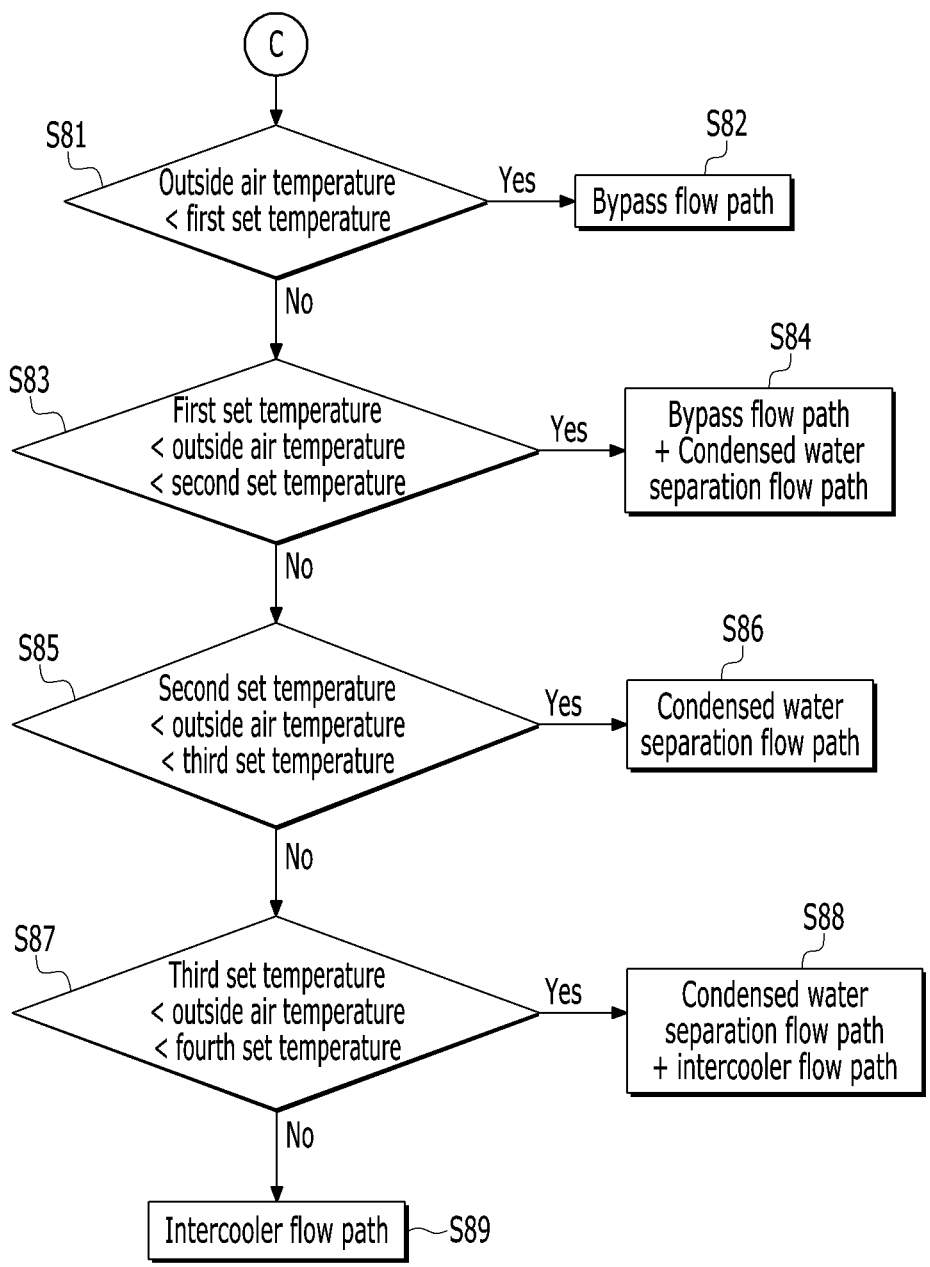

When the internal outlet 123 fluidically-communicates with the fifth intermediate outlet 112-5, the mixture introduced through the external inlet 111 is discharged through the third external outlet 111-3 and flows through the condensed water separation line 14 (see FIG. 11) (in other words, passes through the condensed water separation flow path).

When the internal outlet 123 fluidically-communicates with the sixth intermediate outlet 112-6, the mixture introduced through the external inlet 111 is discharged to the third external outlet 111-3 and the first external outlet 111-1 through the third connection chamber 113-3, some of the mixtures flow through the condensed water separation line 14 and the remaining mixtures passes through the intercooler 60.

On the other hand, as illustrated in FIG. 3, the engine system according to the exemplary embodiment of the present disclosure may further include a controller 150 for controlling the operation of the four-way valve 100 based on a recirculation gas use situation determined based on an outside air temperature and humidity of the recirculation gas, a vehicle speed, and an outside air temperature, and humidity of the recirculation gas, and a detecting unit 90 for detecting an outside air temperature, the humidity of the recirculation gas, and a vehicle speed.

The detecting unit 90 may include a temperature sensor sensing the outside air temperature, a humidity sensor sensing the humidity of the recirculated gas, and a speed sensor sensing the vehicle speed. The outside air temperature, the humidity of the recirculated gas, and the vehicle speed detected by the detecting unit 90 are transmitted to the controller 150.

The controller 150 may be provided with one or more processors operated by a set program, and the set program performs each operation of a method of controlling the engine system according to various exemplary embodiments of the present disclosure.

Hereinafter, the operation of the engine system according to the exemplary embodiment of the present disclosure as described above will be described in detail with reference to the accompanying drawings.

FIG. 13, FIG. 14, FIG. 15 and FIG. 16 are flowcharts illustrating an operation of the engine system according to the exemplary embodiment of the present disclosure.

As illustrated in FIGS. 13 to 16, based on the outside air temperature and the humidity of the recirculation gas detected by the detecting unit 90, the controller 150 determines whether a current situation is a recirculation gas use situation (S10).

When the outside air temperature is lower than a reference temperature (for example, 10 degrees Celsius) and the humidity of the recirculation gas is less than a reference humidity (for example, 90% relative humidity), the controller 150 determines that a situation of the engine system is a recirculation gas non-use situation, and operates the four-way valve 100 so that the mixture of outside air and the recirculation gas compressed by the compressor 52 passes through the intercooler 60 (S11).

At the present time, the internal housing 120 of the four-way valve 100 rotates, so that the intake line 10 downstream of the compressor 52 and the intake line 10 upstream of the intercooler 60 fluidically-communicate. That is, the internal outlet 123 of the internal housing 120 of the four-way valve 100 and the first outlet of the external housing 110 fluidically-communicate, and the mixture introduced into the external inlet 111 of the external housing 110 is discharged through the first external outlet of the external housing 110 through the internal housing 120 and passes through the intercooler 60.

In the case where the situation is not the recirculation gas use situation, the outside air compressed by the compressor 52 is cooled through the intercooler 60 because there is no possibility that condensed water is generated due to the outside air and the recirculation gas.

In operation S10, when the outside air temperature is equal to or greater than the reference temperature (for example, about 10 degrees) and the humidity of the recirculation gas is equal to or greater than the reference humidity (for example, 90%), the controller 150 determines that the situation is the recirculation gas use situation and determines the vehicle speed (S20).

When the vehicle speed is low (for example, less than a first reference speed (for example, 30 kph)) (S20), the controller 150 operates the four-way valve 100 so that the mixture compressed in the compressor 52 passes through the bypass line 12 (S21).

At the present time, the internal housing 120 of the four-way valve 100 rotates, so that the intake line 10 downstream of the compressor 52 and the bypass line 12 fluidically-communicate. That is, the internal outlet 123 of the internal housing 120 of the four-way valve 100 and the second outlet of the external housing 110 fluidically-communicate, and the mixture introduced into the external inlet 111 of the external housing 110 flows through the bypass line 12 while being discharged to the second outlet of the external housing 110 through the internal housing 120.

When the vehicle speed is slow in the recirculation gas use situation, the rotation speed of the engine 20 is low and the air amount introduced into the engine 20 is also relatively small. In the instant case, to prevent unnecessary cooling of the mixture, the mixture is supplied to the engine 20 through the bypass line 12 without passing through the intercooler 60.

When the vehicle speed is high (a second reference speed (for example, 60 kph) or higher in operation S20, the controller 150 operates the four-way valve 100 so that the mixture compressed in the compressor 52 passes through the intercooler 60 (S23).

At the present time, the internal housing 120 of the four-way valve 100 rotates, so that the intake line 10 downstream of the compressor 52 and the intake line 10 upstream of the intercooler 60 fluidically-communicate. That is, the internal outlet 123 of the internal housing 120 of the four-way valve 100 and the first outlet of the external housing 110 fluidically-communicate, and the mixture introduced into the external inlet 111 of the external housing 110 is discharged through the first outlet of the external housing 110 through the internal housing 120 and passes through the intercooler 60.

When the vehicle speed is very high, because the flow rate of the mixture supplied to the combustion chamber is high, so that an effect of condensed water on combustion stability is small. Therefore, in the instant case, the mixture is cooled through the intercooler 60.

If the vehicle speed is an intermediate speed (between the first reference speed and the second reference speed) in operation S20, the controller 150 determines the flow path of the mixture based on the humidity of the recirculation gas and the outside air temperature.

That is, the controller 150 determines the flow path (intercooler flow path, bypass flow path, or condensed water separation flow path) of the mixture of the outside air and the recirculation gas compressed by the compressor 52 based on the humidity of the recirculation gas and the outside air temperature.

[Less than First Reference Humidity]

When the humidity of the recirculation gas is less than first reference humidity (for example, relative humidity 20%) (S30), the controller 150 operates the four-way valve 100 so that the mixture compressed in the compressor 52 passes through the intercooler 60, flow through the bypass line 12, or passes through the intercooler 60 and flows through the bypass line 12 (S40).

In the instant case, the controller 150 may operate the four-way valve 100 so that the flow rate of the mixture passing through the intercooler 60 increases more than the flow rate of the mixture flowing through the bypass line 12 as the outside air temperature increases.

For example, when the outside air temperature is lower than the first set temperature (for example, 20 degrees Celsius) (S41), the four-way valve 100 may be operated so that the mixture compressed in the compressor 52 flows through the bypass line 12 (S42).

When the outside air temperature is low and the humidity of the recirculation gas is very low, the possibility of generation of the condensed water is very low and the temperature of the mixture is relatively low, to prevent unnecessary cooling of the mixture, the mixture is supplied to the engine 20 without going through the intercooler 60.

When the outside air temperature is equal to or greater than the second set temperature (for example 30 degrees Celsius) (S43), the four-way valve 100 may be operated so that the mixture compressed by the compressor 52 passes through the intercooler 60 (S44).

When the outside air temperature is high and the humidity of the recirculating gas is very low, the amount of condensed water generated is small and the temperature of the mixture is high, so that the mixture is cooled through the intercooler 60 and then is supplied to the engine 20.

When the outside air temperature is between the first set temperature and the second set temperature, the four-way valve 100 is operated so that some of the mixture compressed by the compressor 52 flow through the bypass line 12 and the remaining mixtures pass through the intercooler 60 (S45)

When the outside air temperature is at an intermediate level and the humidity of the recirculation gas is very low, some mixtures bypass the intercooler 60 and the remaining mixtures pass through the intercooler 60 to maintain the temperature of the mixture supplied to the engine 20 to an appropriate level.

[Between First Reference Humidity and Second Reference Humidity]

When the humidity of the recirculation gas is between the first reference humidity (for example, relative humidity 20%) and the second reference humidity (for example, relative humidity 40%) (S50), the controller 150 operates the four-way valve 100 so that the mixture compressed in the compressor 52 passes through the intercooler 60, flows through the condensed water separation line 14, or passes through the intercooler 60 and flows through the condensed water separation line 14 (S60).

In the instant case, the controller 150 may operate the four-way valve 100 so that the flow rate of the mixture passing through the intercooler 60 increases more than the flow rate of the mixture flowing through the condensed water separation line 14 as the outside air temperature increases.

For example, when the outside air temperature is less than the first set temperature (S61), the four-way valve 100 may be operated so that the mixture compressed in the compressor 52 passes through the condensed water separation line 14 (S62).

When the outside air temperature is low and the humidity of the recirculation gas is relatively low, the possibility of generation of condensed water is relatively slightly high, so that the mixture passes the condensed water separation line 14 to separate the condensed water and then is supplied to the engine 20.

When the outside air temperature is equal to or greater than the second set temperature (S63), the four-way valve 100 may operate so that the mixture compressed by the compressor 52 passes through the intercooler 60 (S64).

When the outside air temperature is high and the humidity of the recirculating gas is relatively low, the possibility of generation of the condensed water is relatively low, so that the mixture is cooled through the intercooler 60 and then is supplied to the engine 20.

When the outside air temperature is between the first set temperature and the second set temperature, the four-way valve 100 may be operated so that some of the mixture compressed by the compressor 52 flow to the condensed water separation line 14 and the remaining mixtures pass through the intercooler 60 (S65).

When the outside air temperature is at the intermediate level and the humidity of the recirculation gas is low, some of the mixtures separate the condensed water through the condensed water separation line 14, and the remaining mixtures pass through the intercooler 60 to be cooled and then are supply to the engine 20.

[Between Second Reference Humidity and Third Reference Humidity]

When the humidity of the recirculation gas is between the second reference humidity (for example, relative humidity 40%) and the third reference humidity (for example, 60% relative humidity) (S70), the controller 150 operates the four-way valve 100 so that the mixture compressed in the compressor 52 flows through the bypass line 12, flows through the bypass line 12 and the condensed water separation line 14, flows through the condensed water separation line 14, passes through the condensed water separation line 14 and the intercooler 60, or passes through the intercooler 60 (S90).

In the instant case, the controller 150 may operate the four-way valve 100 so that as the outside air temperature increases, the flow rate of the mixture flowing through the condensed water separation line 14 increases more than the flow rate of the mixture flowing through the bypass line 12, and the flow rate of the mixture passing through the intercooler 60 increases more than the flow rate of the mixture flowing through the condensed water separation line.

For example, when the outside air temperature is lower than the first set temperature (for example, 15 degrees Celsius) (S81), the four-way valve 100 may be operated so that the mixture compressed in the compressor 52 passes through the bypass line 12 (S82).

When the humidity of the recirculation gas is between the second reference humidity and the third reference humidity, and the outside air temperature is less than the first set temperature (that is, the situation where the humidity of the recirculation gas is high and the outside air temperature is very low), the possibility of generation of the condensed water is relatively high, so that the mixture compressed in the compressor 52 bypasses the intercooler 60. Accordingly, the mixture compressed by the compressor 52 is cooled while passing through the intercooler 60 to prevent the condensed water from being generated in advance.

When the outside air temperature is between the first set temperature and the second set temperature (for example, 20 degrees Celsius) (S83), the four-way valve 100 may be operated so that some of the mixtures compressed by the compressor 52 pass through the bypass line 12, and the remaining mixtures pass through the condensed water separation line 14 (S84).

When the outside air temperature is between the second set temperature and the third set temperature (for example, 25 degrees Celsius) (S85), the four-way valve 100 may be operated so that the mixture compressed in the compressor 52 passes through the condensed water separation line 14 (S86).

When the humidity of the recirculation gas is between the second reference humidity and the third reference humidity, and the outside air temperature is between the second set temperature and the third set temperature (in other words, the situation where the humidity of the recirculation gas is high and the outside air temperature is medium), the possibility of generation of the condensed water is medium, so that the mixture compressed by the compressor 52 passes through the condensed water separation line 14 to separate the condensed water and then is supplied to the engine 20. Accordingly, the combustion instability of the engine due to the condensed water may be eliminated.

When the outside air temperature is between the third set temperature and the fourth set temperature (for example, 30 degrees Celsius) (S87), the four-way valve 100 may be operated so that some of the mixtures compressed by the compressor 52 pass through the condensed water separation line 14, and the remaining mixtures pass through the intercooler 60 (S88).

When the outside air temperature is equal to or greater than the fourth set temperature, the four-way valve 100 may be operated so that the mixture compressed by the compressor 52 passes through the intercooler 60 (S89).

When the humidity of the recirculation gas is between the second reference humidity and the third reference humidity, and the outside air temperature is equal to or greater than the fourth set temperature (that is, the situation where the humidity of the recirculation gas is high and the outside air temperature is high), the possibility of generation of the condensed water is relatively very low, so that an effect of condensed water on combustion of the engine is very small. Accordingly, the mixture compressed by the compressor 52 is cooled through the intercooler 60 and then supplied to the engine.

[Equal to or Greater than Third Reference Humidity]

When the humidity of the recirculation gas is equal to or greater than the third reference humidity (S70), the controller 150 operates the four-way valve 100 so that all of the mixtures compressed in the compressor 52 pass through the intercooler 60.

When the humidity of the recirculation gas is very high, the exhaust gas recirculation system does not operate, and the intake air compressed by the compressor 52 is cooled through the intercooler 60 and then supplied to the engine 20.

According to the engine system of the present disclosure as described above, damage to the engine 20 by the condensed water may be prevented in advance by minimizing the condensed water introduced into the combustion chamber of the engine 20.

Furthermore, by supplying the mixture to the combustion chamber of the engine 20 through the three flow paths, it is possible to minimize the generation of condensed water.

Furthermore, the use area of the recirculation gas may be widened, and thus, fuel efficiency of the vehicle may be improved.

Furthermore, by diversifying control conditions according to the humidity of the recirculation gas, it is possible to realize efficiency improvement of the recirculation gas supplied to the combustion chamber of the engine 20.

Furthermore, by supplying the mixture to the engine 20 without going through the intercooler 60 when the engine 20 is initially driven, the thermal efficiency of the engine 20 may be increased, resolving the combustion instability caused by the low-temperature mixture.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An engine system, comprising:
an engine including a combustion chamber generating driving force by combustion of fuel therein;
an intake line through which outside air supplied to the combustion chamber flows;
an exhaust line through which exhaust gas discharged from the combustion chamber flows;
a turbocharger including a turbine rotating by the exhaust gas discharged from the combustion chamber and a compressor rotating in conjunction with the turbine and compressing the outside air;
an exhaust gas recirculation device including an exhaust gas recirculation (EGR) line branched from the exhaust line and joining the intake line, an EGR cooler provided in the EGR line, and an EGR valve provided in the EGR line;
an intercooler provided in the intake line downstream of the compressor and configured to cool the outside air compressed by the compressor and a recirculation gas recirculated by the exhaust gas recirculation device;
a bypass line branched from the intake line upstream of the intercooler and joining the intake line downstream of the intercooler;
a condensed water separation line branched from the intake line upstream of the intercooler and joining the intake line upstream of the intercooler;
a condensed water separation module provided in the condensed water separation line and configured to separate condensed water contained in a mixture flowing through the condensed water separation line; and
a four-way valve provided in the intake line between the compressor and the intercooler, and selectively operated so that the mixture of the outside air and the recirculation gas introduced to the upstream of the intercooler passes through the intercooler, flows through the bypass line, or flows through the condensed water separation line.

2. The engine system of claim 1, further including:
a controller electrically connected to the four-way valve and configured for controlling an operation of the four-way valve based on a recirculation gas use situation determined based on at least one of an outside air temperature, humidity of the recirculation gas, and a vehicle speed.

3. The engine system of claim 2, wherein
when the outside air temperature is lower than a reference temperature and the humidity of the recirculation gas is less than a reference humidity, the controller is configured to conclude that a situation of the engine system is a recirculation gas non-use situation, and to operate the four-way valve so that the mixture compressed by the compressor passes through the intercooler.

4. The engine system of claim 2, wherein
when the outside air temperature is equal to or greater than a reference temperature and the humidity of the recirculation gas is equal to or greater than a reference humidity, the controller is configured to conclude that a situation of the engine system is a recirculation gas use situation, and
when the vehicle speed is less than a first reference speed, the controller is configured to operate the four-way valve so that the mixture compressed by the compressor passes through the bypass line.

5. The engine system of claim 4, wherein
when the vehicle speed is equal to or greater than a second reference speed which is greater than the first reference speed, the controller is configured to operate the four-way valve so that the mixture compressed by the compressor passes through the intercooler.

6. The engine system of claim 5, wherein
when the vehicle speed is between the first reference speed and the second reference speed and the humidity of the recirculation gas is less than a first reference humidity,
the controller is configured to operate the four-way valve so that the mixture compressed by the compressor passes through the intercooler, flows through the bypass line, or passes through the intercooler and flows through the bypass line.

7. The engine system of claim 6, wherein the controller is configured to operate the four-way valve to increase a flow rate of the mixture passing through the intercooler more than a flow rate of the mixture flowing through the bypass line when the outside air temperature increases.

8. The engine system of claim 7,
wherein when the outside air temperature is lower than a first set temperature, the four-way valve is operated so that the mixture compressed in the compressor flows through the bypass line,
wherein when the outside air temperature is equal to or greater than a second set temperature higher than the first set temperature, the four-way valve is operated so that the mixture compressed by the compressor passes through the intercooler, and
wherein when the outside air temperature is between the first set temperature and the second set temperature, the four-way valve is operated so that a part of the mixture compressed by the compressor flow through the bypass line and a remaining mixture thereof passes through the intercooler.

9. The engine system of claim 5, wherein
when the vehicle speed is between the first reference speed and the second reference speed and the humidity of the recirculation gas is between a first reference humidity and a second reference humidity higher than the first reference humidity,
the controller is configured to operate the four-way valve so that the mixture compressed by the compressor passes through the intercooler, flows through the condensed water separation line, or passes through the intercooler and flows through the condensed water separation line.

10. The engine system of claim 8, wherein the controller is configured to operate the four-way valve to increase a flow rate of the mixture passing through the intercooler more than a flow rate of the mixture flowing through the condensed water separation line when the outside air temperature increases.

11. The engine system of claim 10, wherein
when the outside air temperature is less than a first set temperature, the four-way valve is operated so that the mixture compressed in the compressor passes through the condensed water separation line, and when the outside air temperature is equal to or greater than a second set temperature higher than the first set temperature, the four-way valve is operated so that the mixture compressed by the compressor passes through the intercooler.

12. The engine system of claim 5, wherein when the vehicle speed is between the first reference speed and the second reference speed and the humidity of the recirculation gas is between the second reference humidity and a third reference humidity higher than the second reference humidity, the controller is configured to operate the four-way valve so that the mixture compressed by the compressor flows through the bypass line, flows through the bypass line and the condensed water separation line, flows through the condensed water separation line, passes through the condensed water separation line and the intercooler, or passes through the intercooler.

13. The engine system of claim 12, wherein the controller is configured to operate the four-way valve so that as the outside air temperature increases, a flow rate of the mixture flowing through the condensed water separation line increases more than a flow rate of the mixture flowing through the bypass line, and a flow rate of the mixture passing through the intercooler increases more than the flow rate of the mixture flowing through the condensed water separation line.

14. The engine system of claim 13, wherein:

when the outside air temperature is lower than a first set temperature, the four-way valve is operated so that the mixture compressed in the compressor passes through the bypass line, when the outside air temperature is between the first set temperature and a second set temperature higher than the first set temperature, the four-way valve is operated so that a part of the mixtures compressed by the compressor pass through the bypass line, and remaining mixture thereof passes through the condensed water separation line, when the outside air temperature is between the second set temperature and a third set temperature higher than the second set temperature, the four-way valve is operated so that the mixture compressed in the compressor passes through the condensed water separation line, and when the outside air temperature is between the third set temperature and a fourth set temperature higher than the third set temperature, the four-way valve is operated so that a part of the mixtures compressed by the compressor pass through the condensed water separation line, and remaining mixture thereof passes through the intercooler.

15. The engine system of claim 5, wherein:

when the vehicle speed is between the first reference speed and the second reference speed and the humidity of the recirculation gas is equal to or greater than a third reference humidity, the controller is configured to operate the four-way valve so that the mixture compressed by the compressor passes through the intercooler.

16. The engine system of claim 5, wherein:

when the vehicle speed is between the first reference speed and the second reference speed and the humidity of the recirculation gas is equal to or greater than a fourth reference humidity, the controller is configured to operate the four-way valve so that the mixture compressed by the compressor passes through the intercooler.

17. The engine system of claim 1, wherein the condensed water separation module includes:

a module external main body;

a module internal main body provided inside the module external main body;

a rotation guide provided inside the module internal main body, wherein the mixture of the outside air and the recirculation gas introduced into the condensed water separation module is rotated in a circumferential direction by the rotation guide;

a storage chamber formed between the module external main body and the module internal main body; and a communication hole formed in the module internal main body and fluidically-communicating with the storage chamber.

* * * * *